Jan. 5, 1971                  A. M. KING                  3,552,976

METHOD OF BREWING SINGLE CUP QUANTITIES OF BEVERAGE

Filed Nov. 3, 1966                                4 Sheets-Sheet 1

INVENTOR
Alan M. KING

ATTORNEY

INVENTOR
Alan M. KING
ATTORNEY

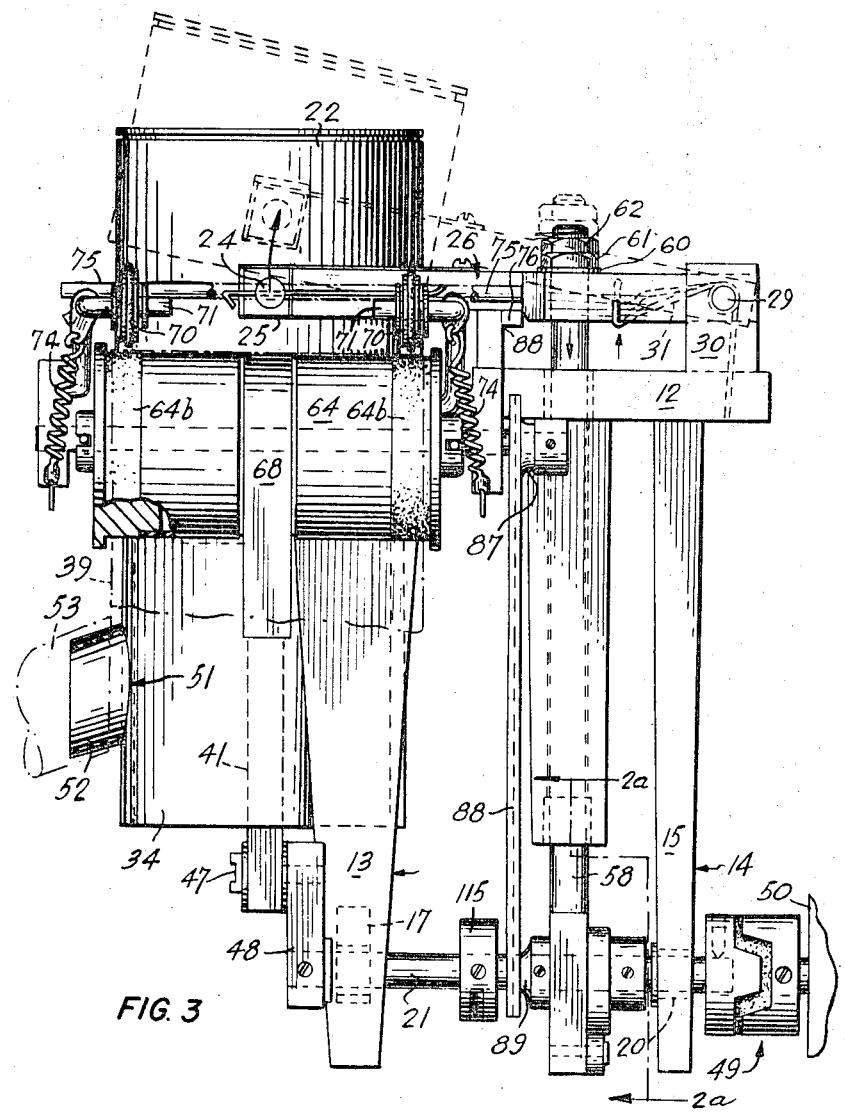

Jan. 5, 1971 A. M. KING 3,552,976
METHOD OF BREWING SINGLE CUP QUANTITIES OF BEVERAGE
Filed Nov. 3, 1966 4 Sheets-Sheet 4
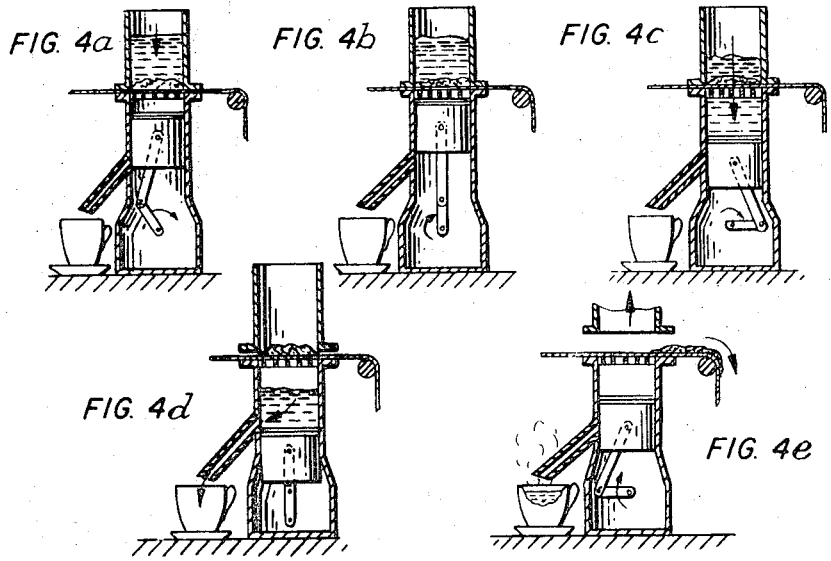
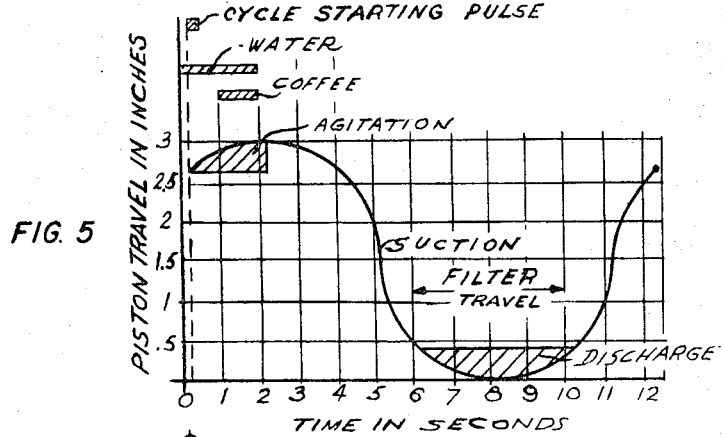
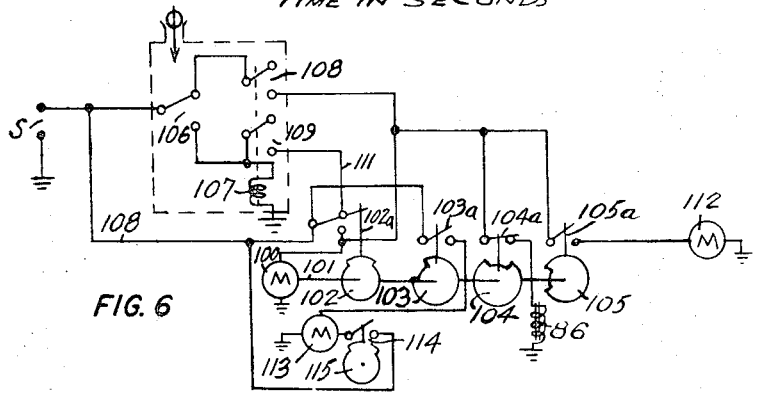
*INVENTOR*
Alan M. KING
*ATTORNEY*

United States Patent Office 3,552,976
Patented Jan. 5, 1971

3,552,976
METHOD OF BREWING SINGLE CUP QUANTITIES OF BEVERAGE
Alan M. King, Westmount, Quebec, Canada, assignor to Vendking Ltd., Greenfield Park, Quebec, Canada
Filed Nov. 3, 1966, Ser. No. 591,816
Int. Cl. A23f 1/08
U.S. Cl. 99—71                                   6 Claims

ABSTRACT OF THE DISCLOSURE

Method for brewing beverage from hot water and ground beverage material comprising the steps of: supplying the hot water and beverage material, having a floor permeable to gas and liquid and impermeable to the material, forcing air upwardly through the floor of the chamber to agitate the water and beverage material for a predetermined time and then withdrawing the beverage down through the chamber floor.

---

The present invention relates to a method and apparatus for brewing a beverage from hot water and ground material, and particularly, although not exclusively, to the automatic brewing of coffee. The invention has special application to the automatic brewing of fresh coffee or other similar beverages such as, for example, tea, in single cup quantities in coin operated vending machines.

Coffee vending machines in current use generally brew a substantial quantity of coffee and store it in heated containers in readiness for dispensing. If one such container is not emptied within a brief period of time, the coffee becomes stale and bitter.

Proposals have been made to design machines to brew a single cup of coffee at a time. Some such machines employ powered soluble or "instant" coffee which is merely mixed with hot water and the quality of such coffee is generally poor. In other cases, the coffee has to be brewed in an unusually short period of time to avoid dissatisfaction by customers who must wait in line to operate the machine. In order to extract the correct quantity of solubles economically under ambient pressure conditions, the coffee must be maintained in contact with the hot water for at least a short period of time. In home brewing or batch brewing, this time is normally of the order of several minutes. The brew period may be reduced by increasing the concentration of coffee grounds per cup, but this is naturally uneconomical. Furthermore, the extraction so produced is "unbalanced" in the sense that certain solubles are present to excess and others are absent, leading to a bitter taste.

In order to speed up the cycle of operation, a single cup machine presently in use or under construction uses excess pressure, for example, by means of an applied piston or air or water pressure to force hot or superheated water through ground coffee into the cup. Such methods are undesirable in that less than the correct percentage of solubles is extracted leading to bitter and unpalatable coffee. This is due to the fact that the first increment of water passes rapidly through the grounds before they have time to swell and extract little, if any, coffee solubles. Again, the practice is to add more than the correct amount of coffee grounds leading to unbalanced liquor and uneconomical extraction.

It is an aim of the present invention to provide a method and apparatus for brewing coffee or a similar beverage in which the disadvantages above are substantially reduced and in which, nevertheless, the coffee can be brewed in small quantities, for example, single cup quantities within a feasible period of time, for example, 10 to 15 seconds. In accordance with the invention, the coffee is brewed without the use of excess pressure to force the hot water through the coffee, and in accordance with a preferred aspect, the coffee is agitated in contact with the hot water immediately before separation.

In accordance with one aspect of the invention, there is provided a method of brewing a beverage from hot water and brewable ground material comprising:

supplying a controlled amount of said ground material and a controlled amount of hot water at brewing temperature to a first chamber at atmospheric pressure, the chamber having a floor permeable to gas and liquid and impermeable to said coffee grains, after a predetermined extraction period applying a subatmospheric pressure below said floor to draw extracted coffee brew through said floor so as to separate the available liquor from waste ground material remaining on said floor, and dispensing the whole of said liquor from a position below said floor.

It has been found that the above method enables good quality coffee to be brewed in single cup quantities very rapidly and economically, and the method is particularly suitable for application in vending machines, as will become apparent.

Preferably, a super-atmospheric pressure is applied below the said floor during said extraction period to cause agitation of the ground material and water. During such agitation, air is forced into the ground material and water trapped in the first chamber. It has been found that such agitation by blowing air through the material under extraction leads to a surprising and unexpected acceleration of the extraction process. The mechanism of this effect is not fully understood and may be due to a catalytic action of the air in providing three component interfaces and/or localized pressure gradients, and/or to a chemical interaction. The ground material is preferably ground coffee, but tea leaves may be substituted if it is desired to brew tea.

The first chamber may communicate through the floor with a cylinder having a vertical sliding piston and having an outlet spaced below the floor, the piston being moved downward to produce the reduced pressure until separation is complete and then further to open the outlet to dispense the brew.

The invention includes apparatus for brewing a beverage from hot water and ground material comprising:

A first chamber having a peripheral wall,

A floor permeable to gas and liquid and impermeable to said ground material adapted to make sealing contact with said wall, and access means to said chamber for atmospheric air and for controlled aliquots of ground material and hot water, A second chamber upwardly open to and in sealing contact with said floor, Means (a) for supplying said aliquots to said first chamber substantially simultaneously, Means (b) for applying a subatmospheric pressure in said second chamber sufficient to separate brewed liquid from waste ground material and to draw such liquid through said floor into said second chamber, and Means (c) for dispensing extracted liquid from said second chamber.

Preferably, the operating means is arranged to operate said means (a), means (b), and means (c) successively in a continuous cycle with means (b) commencing after a predetermined extraction period and means (c) commencing after substantially complete separation of said brewed liquid from said waste ground material.

The second chamber may comprise a vertical cylinder and a piston slideable in the cylinder and forming its floor, the operating means arranged to move the piston upwardly at least a small amount to create the required superatmospheric pressure, and thereafter to move the piston downwardly to create the required subatmospheric pressure within the cylinder.

In accordance with another aspect of the invention, there is provided in apparatus for the automatic brewing of coffee, the combination comprising:

A brew chamber having inlet means for coffee and hot water and outlet means,

Means for supporting a disposable filter in closing engagement with said outlet means, A cylinder communicating with said brew chamber through said outlet means, A piston slideable in said cylinder and adapted upon movement in one direction to withdraw water and solubles through said outlet past a said filter, and Outlet means openable upon completion of said withdrawing movement of said piston for allowing outflow of water and solubles from said cylinder.

Having thus generally described the invention, a preferred embodiment is hereafter described in greater detail, illustrating the preferred method of operation, with reference to the accompanying drawings, in which:

FIG. 3 is a side elevation of the brewer unit of FIG. 1 viewed from a position at the bottom of FIG. 1;

FIGS. 4a, 4b, 4c, 4d and 4e are diagrammatic views of the brewer unit, illustrating the position of the components during different stages in the cycle of operation;

FIG. 5 is a graph of piston travel against time, illustrating the timing of the various operations of the machine; and FIG. 6 is a circuit diagram of the operating means.

Figure 1:
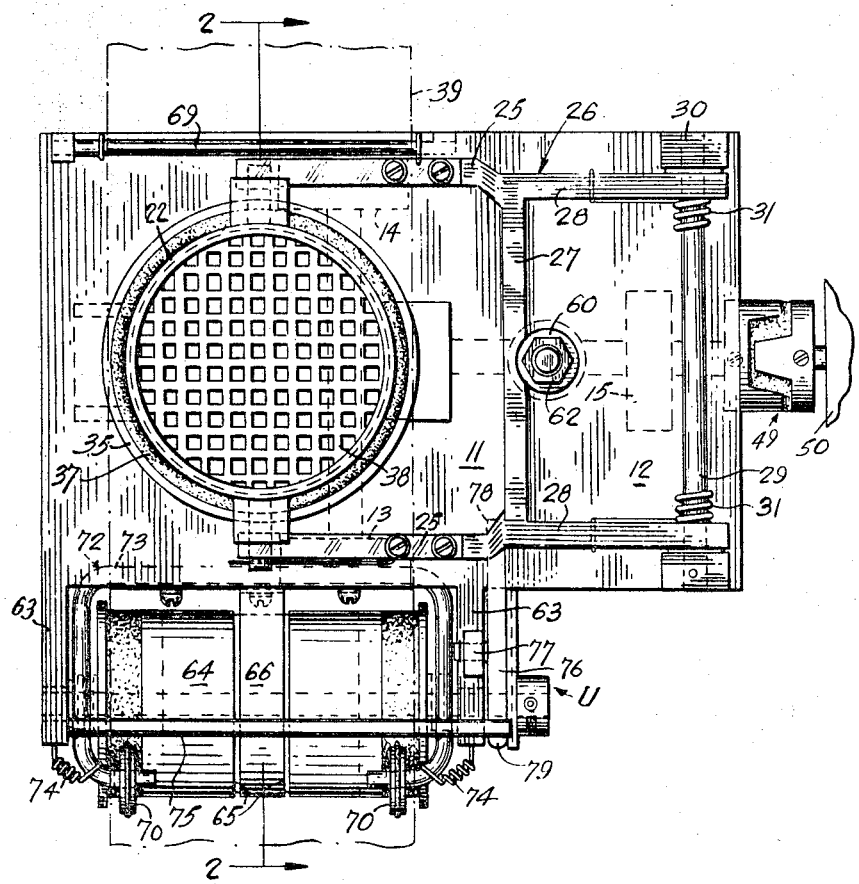
FIG. 1 is a plan view of the brewer unit of a single cup coffee vending machine in accordance with the present invention.
Figures 2, 2A:
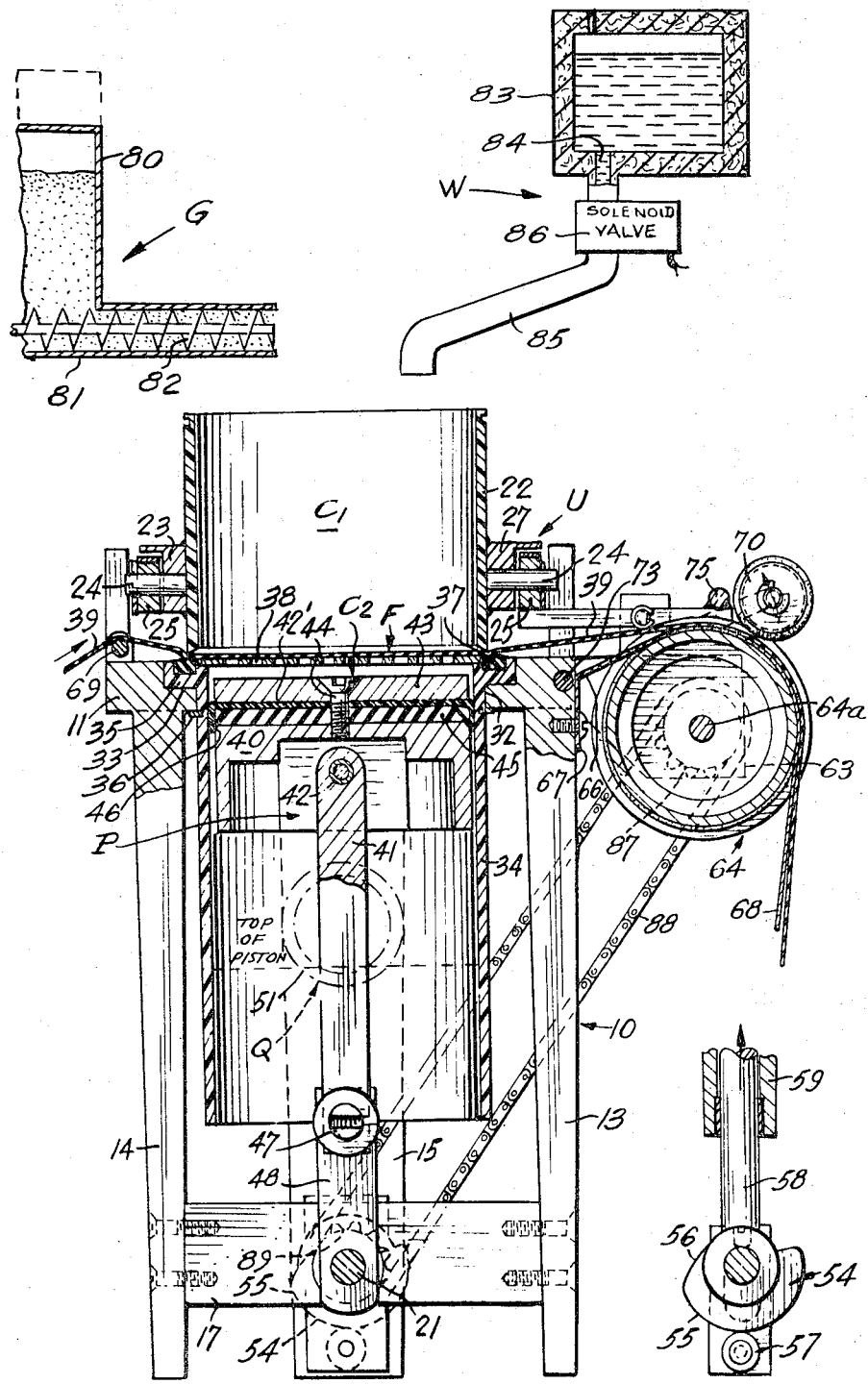
FIG. 2 is a vertical cross-section along the line 2—2 of FIG. 1, illustrating also the means for passing aliquots of ground coffee and aliquots of water to the brewer unit.
FIG. 2a is a part section along the line 2a—2a of FIG. 3.

Referring to the drawings, the principal components of the machine are best illustrated in FIG. 2 where there is shown a brewer unit U which is constructed to provide a brew chamber C1, open at the top to allow the entry of aliquots of coffee grounds from a coffee dispenser G and aliquots of hot water from water dispenser W. The brew chamber C1 is provided with a floor F which is permeable to water but impermeable to the coffee grounds and which divides chamber C1 from a second chamber C2 underneath. Means such as a piston P are provided for applying a subatmospheric pressure in the second chamber C2, to separate the brewed liquid from the ground material and draw the brewed liquid through the floor into the second chamber C2. An outlet Q is provided in the wall of the second chamber C2 at a spaced location from the floor and cooperates with the piston P to constitute means for dispensing the extracted liquid from the second chamber. Operating means to be described are provided to actuate the various components to brew and dispense a single cup of coffee in a continuous cycle upon insertion of a coin.

The brewer unit U comprises a base structure 10 of machined metal having a brewer platform 11, and an extension platform 12 integral therewith. The platforms 11 and 12 are supported upon spaced vertical legs 13, 14 and 15. Front leg 13 and rear leg 14 depend from platform 11 and are interconnected near their lower ends by a bearing strut 17. Leg 15 depends from platform 12 centrally between legs 13, 14 and to one side of them and itself contains a bearing horizontally aligned with a bearing in strut 17, the bearings mounting a horizontal drive shaft 21 to be further described.

The upper chamber C1 is constituted by an open cylinder 22 which may be of plastics material such as acetal resin, for example, as sold under the registered trademark "Delrin." Diametrically opposed stubs 23 extend frontwardly and rearwardly from the cylinder 22 and constitute mountings for a pair of stub axles 24 which are pivotally mounted at the ends of fork limbs 25 of a supporting frame 26. The frame 26 includes a web 27 joining the limbs 25 and a further pair of oppositely directed limbs 28 which are pivotally mounted at the end remote from cylinder 22 on an axle 29. The axle 29 is supported between uprights 30 which extend a short distance upwardly from the extension platform 12 at each side of the machine. Coil springs 31 are arranged around the axle 29 and tend to urge the frame 26 and the cylinder 22 to a raised tilted position shown in dotted lines in FIG. 3, clear from the platform 11.

The platform 11 is formed with a central aperture 32, counterbored from the upper surface to provide a step 33. The lower chamber C2 is constituted by a second open cylinder 34 of similar material to chamber C1, and which is provided with a flange 35 at its upper end. The flange is constructed to seat within the counterbore against the step 33. A split ring 36 clamps the cylinder 34 in position against the undersurface of the platform 11. The flange 35 is formed in its upper surface with a circular groove, aligned below the cylinder 22 in its lower position and seated within the groove is a sealing ring 37 of rubber or resilient plastics material. The ring 37 stands flush with the platform 11 so as to constitute a seal for the lower rim of the cylinder 22. Inwardly of the ring 37, the flange 35 is counterbored to receive a perforated plate 38 which constitutes part of the floor F, and to act as a support for a continuous strip of filter paper 39 which constitutes the remainder of the floor F. As shown in FIG. 2, the cylinder 22 in its lower position is adapted to clamp the filter paper 39 against the sealing ring 37 to seal the lower end of the chamber C1 and at the same time to seal the upper end of the chamber C2.

The piston P is arranged to slide within the lower cylinder 34. The piston comprises a piston head 40, conventionally recessed in its lower surface to receive the end of a connecting rod 41 which is generally mounted within the recess through a crank pin 42. The piston head 40 is arranged as a loose fit within the cylinder 34. A cap washer 42' of a resilient self-lubricating plastics material such as tetrafluoroethylene, fits over the top of the piston head 40 and is held in place by a circular plate 43 secured to the piston head 40 by a countersunk bolt 44. Between the cap washer 42' and the piston head is a resilient, for example, rubber, washer 45 of substantial thickness, for example, ⅛" and having a chamfered upper edge. The plate 43 compresses the rubber washer 45 and so forces the rim 46 of the cap washer 42' into sealing engagement against the inner surface of cylinder 34.

The lower end of the connecting rod 41 is connected by a crank pin 47 to a crank 48 secured to one end of the drive shaft 21 as shown best in FIG. 3. The drive shaft 21 is connected through a flexible coupling 49 to a reduction gear box 50 driven by an electric motor (not shown). Energization by the motor causes rotation of the drive shaft 21 causing reciprocating motion of the piston P.

In the wall of the cylinder 34 nearer its lower end is arranged a discharge aperture 51 around the outside of which projects a spout 52 to which may be fitted, if desired, a flexible tube 53, to direct the discharged coffee liquor to a suitable position for filling coffee cups.

The aperture 51 and spout 52 constitute discharge means generally indicated at Q. The aperture 51 is so located with respect to the piston stroke that when the top of the piston is aligned with the top of the outlet 51, the volume defined between the top of the piston and the floor is sufficient to hold the contents of a cup of coffee. The chamber C1 is of sufficient volume to hold a similar quantity. At the same time, the bottom dead-centre position of the piston P is indicated in dotted lines in FIG. 2, and it will be appreciated that in such position the outlet 51 is substantially or entirely uncovered.

Mounted to the drive shaft 21 at a position below the extension platform 12 is a cam 54 (FIG. 2a). The cam 54 has a large radius 55 covering approximately 240° and sloping to a low radius 56 covering the remaining circumference. A cam follower roller 57 is located under and in contact with the cam surfaces 55 and 56 and mounted to a reciprocating rod 58 which is slidingly supported in a bearing member 59 depending from and mounted to the platform 12. The upper end of the rod 58 is threaded to receive a washer 60, an adjusting nut 61 and a lock nut 62. The washer 60 is arranged as shown in FIG. 3 to engage the top surface of the web 27 of the supporting frame 26 for the upper cylinder 22. When large radius 55 is in contact with the cam follower 57, as shown in the figures in plain lines, the frame 26 is held down against the springs 31 so that the cylinder 22 is in sealing engagement against the floor F. As the cam follower 57 rides over the small radius 56, the springs 31 raise the frame 26 and the cylinder 22 to the position shown in dotted lines in FIG. 3. As shown in the figures, the cylinder 22 is raised only when the piston P is in the third of its cycle centred around the bottom dead-centre position, at which time the outlet 51 is uncovered.

Bracket arms 63 extend from the front of the platform 11 and support the axle 64a of a drum 64, constructed, for example, of a plastic tube fitted to end castings provided with a roughened or knurled exterior surface 64b of cast aluminum. The drum is of sufficient length to cover the entire diameter of the perforated portion of the plate 38 and sealing ring 37. The drum 64 has a central peripheral recess 65 of sufficient width and depth to receive a lightly sprung or hinged strip 66 which is mounted at its rear end 67 to the frame 11, with its front end 68 bent over the drum 64 along the recess 65 for the purpose of preventing the filter paper 39 from wrapping under the drum. The strip of filter paper 39 is fed in the direction of the arrow in FIG. 2 from a supply roll (not shown) over a guide rod 69 raised slightly above the level of the floor F, over the seal 37 and plate 38 and over the strip 66 and drum 64. In use, the drum 64 extends over a waste container. The axle 64a of the drum 64 is driven from a sprocket wheel 87 connected by chain 88 with a second sprocket wheel 89 mounted on the drive shaft 21, so that the drum is continually rotated so long as the drive shaft 21 is in motion.

Pulley wheels 70 are arranged to press the filter paper 39 into contact with the knurled end regions of the drum 64 during the time that the frame 26 and upper cylinder 22 are in their raised position. The pulleys 70 are mounted on the inwardly turned horizontal limbs 71 of a wire frame 72. The web 73 of the frame is journally mounted in a bore in the platform 11 and the limbs 71 are urged downwards by springs 74 so as to tend to press the pulleys 70 into contact with the filter paper 39 and press this into engagement with the drum 64. A cross-bar 75 is welded across the limbs 71. A rocker lever 76 pivoted intermediate its length to a mounting 77 rigid with one of the supports 63 has its rear end 78 passed under the front limb 25 of the rocking frame 26, and its front end 79 passed under the cross-bar 75. With the frame 26 in its lower position, the front end 79 of the rocker bar 76 is raised, lifting the cross-bar 75 against the action of the spring 74 to raise the pulley wheel 70 out of contact with the filter paper 39. Thus, the filter paper strip 39 is only enabled to move by contact with the drum 64, when the frame 26 and cylinder 22 are in their raised position, relieving the pressure on the cross-bar 75. In this raised position the filter paper under tension between the drum 64 and guide 69 rises away from the plate 38, breaking the surface tension adhering it thereto, and allowing air to pass underneath through the plate 38 into chamber C2.

As illustrated in FIG. 2, the machine, in addition to the brewing unit U, includes a coffee dispenser G. A typical conventional device is shown and includes a hopper 80 having a horizontal cylindrical spout 81 directed over the open top of the cylinder 22. A conveyor screw 82 which may be in the form of a coiled wire and which acts in the manner of an Archimedes screw is passed through the spout and under the coffee grounds stored in the hopper 80, the screw being turned by means of a motor (not shown) in order to carry coffee along the spout 81 and into the chamber C1. The machine is also inclusive of means for admitting to the chamber C1 aliquots of hot water at a temperature sufficient for brewing, that is, at about 20° F. The water dispenser W includes a lagged hot water tank 83 in which water is maintained by conventional thermostatic means at near boiling temperature. The tank 83 is provided with an outlet 84 at its lower end from which a pipe 85 leads hot water into the top of the cylinder 12. A solenoid valve 86 is provided in the pipe 85 to control the admission of water.

The machine is also inclusive of operating means including a timer circuit illustrated in FIG. 6. With reference to FIG. 6, there is shown a timer motor 100 having shaft 101 to which are connected a plurality of cams 102, 103, 104 and 105, arranged to operate respective cam switches 102a, 103a, 104a and 105a. The cams are indicated in position at the start of a brewing cycle. A live source S is provided having one end connected to ground and the live terminal connected to the pole of a two-way coin operated impulse switch 106. The normally disengaged contact switch 106 is connected to the coil of a double pole relay 107, the other end of which is grounded and also to the pole of one contact switch of the relay. Thus, an impulse from switch 106 energizes the relay 107 after which a holding circuit provided through the relay contact switch 109 holds the relay closed. The timer motor is then energized through the second relay contact switch 108, the pole of which is connected to the normally engaged contact of switch 106. Simultaneously, the solenoid valve 86 governing the water admission is energized through cam switch 104a. After a brief interval, the coffee motor 112 is energized through cam switch 105a, the solenoid 86 and coffee motor 112 being de-energized after a predetermined period in dependence upon the shape of the cams 104, 105 set to provide the requisite aliquots of water and coffee. Again, after a predetermined period of time after the water operation has started, the brewer unit motor 113 is energized through cam switch 103a.

Once the brewer motor has been energized, a cycle switch 115 operated by a cam mounted upon the drive shaft 21 provides an alternative source of current, and this source continues to supply the brewer motor until the end of a cycle when the alternative supply is broken, again by cycle switch 115. The timer motor 100 is deenergized by cam switch 102a after completion of the addition of water and coffee aliquots. The breaking of switch 102a breaks the holding circuit for the relay with the timer cams in the correct position for the start of the next cycle.

The operation of the machine is illustrated more particularly with regard to FIGS. 4a to 4e and FIG. 5. At the commencement of the cycle, with cams in the position shown in FIG. 6, the piston is in the position indicated in FIG. 4a, that is, in an intermediate position on the upstroke a little higher than the mean position of the piston. It will be appreciated that the FIGS. 4a to 4e are diagrammatic, the outlet spout being shown on a different side of the unit for the sake of clarity. As shown in FIG. 5, the first operation to commence is the addition of water, since this takes a relatively long period by comparison with the addition of coffee. The water addition takes about 2 seconds and corresponds approximately with the time taken by the piston to complete its upstroke. The brewer motor, however, is not started until a fraction of a second after the commencement of the addition of water as indicated by the position of the cycle starting pulse in FIG. 5, due to the shape and position of the cam 103. The coffee motor is energized next so as to complete the coffee addiiton at the same time as the water addition is completed and shortly before the piston P reaches its top dead-centre position (FIG. 4b).

During this period of upstroke, which precedes and includes the brew period, the piston forces air up through the filter paper and perforated support 38 firstly through the water alone, then throughout the addition of the coffee and remainder of the water, and finally through the brewing mixture during the remainder of the brew period to cause generation of air bubbles in the water and agitation of the grounds. As previously explained, this action greatly accelerates the brewing and allows an optimum percentage of the solubles to be extracted in the time allowed. After about 2 seconds from commencement, cams 104 and 105 stop the water and coffee addition, and shortly after that, the piston reaches top dead-centre (FIG. 4b) and starts its downstroke. During the downstroke, a sub-atmospheric pressure is provided in the chamber C2 drawing the extracted coffee liquor through the filter paper into chamber C2.

It will be appreciated that this procedure causes rapid separation of the coffee from the coffee grounds without resort being made to excess pressures in the coffee brew chamber. The volume of the chamber C1 and C2 is so adjusted that all the coffee liquor is withdrawn into chamber C2 a little before the top of the piston P is on a level with the top of the outlet 51 (FIG. 4c). When the top of the piston P starts to uncover the outlet 51, the coffee liquor is passed out into the cup provided at the end of the tube 53. Discharge is assisted by the admission of air into chamber C2. This is caused by the cam 54 raising the frame 26, cylinder 22 and filter paper 39 away from its sealing engagement with the perforated plate 38, so that air is allowed to pass through the plate 38 into chamber C2 (FIG. 4d). As the cylinder 22 is raised, the pulleys 70 press the filter paper strip 39 against the drum 64, and the waste grounds are drawn out under the lower rim of cylinder 22 and over the drum 64 into the waste container (not shown), presenting a fresh area of filter paper over the perforated support 38 (FIG. 4e). Filter travel and liquor discharge take about a third of the cycle, i.e., about 4 seconds, as illustrated in FIG. 5. As already described, the timer cycle comes to an end upon breaking of the cam switch 102a after the water and coffee have been added, the brewer motor being continued by the alternative cycle provided through the cycle switch 115. The cycle switch 115 brings the brewer motor 113 to a halt at the starting position illustrated in FIG. 4a ready for the next cycle.

It will be apparent that the present method and apparatus provide a rapid means for brewing single cup aliquots of coffee, the whole cycle from insertion of the coin taking only about 12 seconds. At the same time, the coffee is of an extremely high quality while providing an optimum extraction of the percentage of solubles in the coffee, the quality of the coffee being fully comparable with the best produced batch brewed coffee.

It will be further apparent that many modifications may be made within the scope of the invention as defined in the following claims. Although the method and apparatus are particularly suitable for coffee brewing, it will be apparent that tea and other similar beverages may be automatically brewed in the same way. Again, while the piston and cylinder of the illustrated apparatus are preferred, other means such as pumps and valves may be used to provide the sub-atmospheric and super-atmospheric pressures.

I claim:
1. A method of brewing a beverage in single cup quantities from hot water and ground beverage material comprising:
   (a) supplying a predetermined amount of said material and hot water to a chamber having a floor which is permeable to gas and liquid and impermeable to said material,
   (b) forcing air through substantially the entire area of the floor into the chamber before any substantial amount of hot water permeates the floor to thoroughly agitate and mix substantially the entire predetermined amount of hot water and material for a predetermined time, and
   (c) applying a subatmospheric pressure so as to withdraw the brewed beverage through the floor of the chamber.

2. A method of brewing a beverage as claimed in claim 1 wherein the steps of supplying a predetermined amount of material and hot water and the step of forcing air through the floor into the chamber are commenced at the same time with the air continued to be forced through the floor into the chamber for a predetermined time after the supplying of the material and hot water has been completed.

3. A method of brewing a beverage as claimed in claim 1 including the step of first forming the chamber prior to supplying the material and hot water, the chamber being formed by moving an open-end tubular member into sealing contact with a surface of the floor thereby closing the open end of the member.

4. A method of brewing a beverage as claimed in claim 3 including the step of raising the tubular member away from the floor after the beverage has been withdrawn from the chamber, and, while the member is raised, removing the used (ground) material.

5. A method of brewing a beverage as claimed in claim 4 wherein the used ground material is removed by replacing a portion of the gas and liquid permeable floor carrying the (ground) material with an unused permeable floor portion.

6. A method of brewing a beverage as claimed in claim 1 wherein the hot water is supplied at a temperature between 195° F. and 200° F.

References Cited
UNITED STATES PATENTS

| | | | |
|---|---|---|---|
| 1,376,287 | 4/1921 | Meyfarth | 99—302 |
| 1,830,000 | 11/1931 | Miller et al. | 99—302 |
| 2,875,681 | 3/1959 | Casey | 99—317X |
| 3,279,925 | 10/1966 | Cowley | 99—71 |
| 3,121,625 | 2/1964 | Broughton | 55—58 |
| 3,209,676 | 10/1965 | Zimmermann et al. | 99—289 |

FOREIGN PATENTS

| | | | |
|---|---|---|---|
| 18,325 | 9/1893 | Great Britain | 23—267 |

MAURICE W. GREENSTEIN, Primary Examiner

U.S. Cl. X.R.

99—287, 289, 283, 302, 77